(12) United States Patent
Comte

(10) Patent No.: US 7,893,587 B2
(45) Date of Patent: Feb. 22, 2011

(54) BRUSHLESS DC ELECTRIC MOTOR

(75) Inventor: Vincent Comte, Le Mont-sur-Lausanne (CH)

(73) Assignees: Electromag SA, Ecublens (CH); Micronel AG, Tangelswangen (CH)

( * ) Notice: Subject to any disclaimer, the term of this patent is extended or adjusted under 35 U.S.C. 154(b) by 146 days.

(21) Appl. No.: 12/257,234

(22) Filed: Oct. 23, 2008

(65) Prior Publication Data
US 2010/0102665 A1   Apr. 29, 2010

(51) Int. Cl.
H02K 3/00 (2006.01)
(52) U.S. Cl. ..................................................... 310/179
(58) Field of Classification Search ................. 310/179, 310/201, 206, 208
See application file for complete search history.

(56) References Cited

U.S. PATENT DOCUMENTS 6,034,463 A * 3/2000 Hansson .............. 310/216.002

2003/0127933 A1* 7/2003 Enomoto et al. ............ 310/194
2007/0103025 A1* 5/2007 Rohrer et al. ............... 310/179
2007/0176509 A1* 8/2007 Kalsi et al. .................. 310/208

* cited by examiner

Primary Examiner—Nguyen N Hanh
(74) Attorney, Agent, or Firm—Browdy and Neimark, PLLC

(57) ABSTRACT

The brushless DC electric motor comprises, a rotor including a shaft and a permanent magnet fixed on said rotor shaft, stator including a winding in the shape of a hollow cylinder and composed of a plurality of rhombic single coils made of flat wire. The single coils overlap each other in an imbricated manner, wherein the single coils are performed to form an offset at least in the region of two opposite corners. The winding have legs, wherein half of the legs are located in a first radius and half of the legs are located in a second radius. The motor further comprises a housing having two end plates and supporting said rotor and stator.

2 Claims, 6 Drawing Sheets

BRUSHLESS DC ELECTRIC MOTOR

FIELD

This invention relates to a brushless DC electric motor.

BACKGROUND

A brushless DC electric motor of this type is known from EP-A-1 780 871. The winding of the stator is composed of a plurality of coils which are interleaved above each other and has a central axis of symmetry, which is also the axis of rotation of the rotor. The coils have four legs, wherein at least a section of each leg touches an edge of the adjacent winding. To produce the offsets at the regions of the two opposite corners of the coils, at each corner a hairpin-type bulge is necessary. Additional wire length is necessary to form the hairpin-type or loop-shaped bulge at an inner contour of the coils. Forming operation is required to complete a stator assembly.

U.S. Pat. No. 4,130,769 discloses a brushless DC motor, which has an armature coil body composed of a plurality of coils in a polygonal form of which at least two sides are placed parallel to the rotary axis of the motor. The coils are of planar shape and especially hexagonal or rectangular shape.

U.S. Pat. No. 6,355,993 discloses a linear motor having polygonal shaped coil units. The coils are arranged linearly and bonded to a substantially planar electrically insulating substrate.

SUMMARY

It is an object of the invention to provide a brushless DC electric motor, which can more easily be assembled together to form a hollow cylindrical shape. It is a further object of the invention to provide a brushless DC electric motor which enables to determine with a higher level of accuracy the angular position of the axis of each phase.

One generic solution to the problems resides in the single coils, which are arranged in the winding body and which are made from flat wires. The winding body of the stator contains a plurality of individual coils which are wound with a given number of turns using a flat wire and preferably a wire with a rectangular cross section, also called "rectangular wire". Each individual coil is formed separately to obtain an accurate shape. One side of each coil is bent on a small radius at an external side and on a larger radius on a external side. The coils are assembled together so that the internal side of one coil can overlap with the external side of another coil. All coils can interlock into each other to obtain the cylindrical winding body. The individual coils can be connected together using different types of PCB to obtain different connection patterns, for example serial or parallel connection, star or delta connection.

Stators using formed individual coils made of flat and especially rectangular wire provide electric motors with increased space factor and with lower losses.

One major advantage of this invention is that the shape of the single coils is extremely accurate. This high accuracy comes from the fact that the single coils are made of rectangular wires, bonded together and then bent to obtain very accurate pre-defined shapes. With such accurate shapes for single coils, it is possible to determine with a high level of accuracy the angular position of the axis of each phase. Once these axes have been determined, it is possible to accurately and cost-effectively assemble a PCB assembly with hall sensors at the correct angular position onto the coils assembly. This assembly operation can be done but using a simple angular locating fixture, which reduces complexity in assembly. It is a further aspect of the invention, that the coils are arranged in the winding body in a manner that there is a gap between the legs of adjacent coils.

The coils do not need additional wire length to form a hairpin-type or loop-shaped bulge and can therefore be manufactured with reduced phase resistance and therefore copper losses. The gaps between the coils have the further advantage that the mechanical assembly of the stator is easier and they introduce a neutral zone between two coils. The mechanical assembly of a stator of this type is also easier because no forming operation of the complete stator assembly is required and because position hall sensors can be placed accurately at their optimum angular position with respect to stator angles. The coils have each a rhombic shape, wherein the sides of the coils are oblique to the axis of the rotor.

BRIEF DESCRIPTION OF THE DRAWINGS

Further features, objects and advantages of the invention will become appended by referring to the following description in conjunction with the appended drawings.

Now the invention is described in the following with reference to the appended drawings, in which.

DETAILED DESCRIPTION

Figure 1:
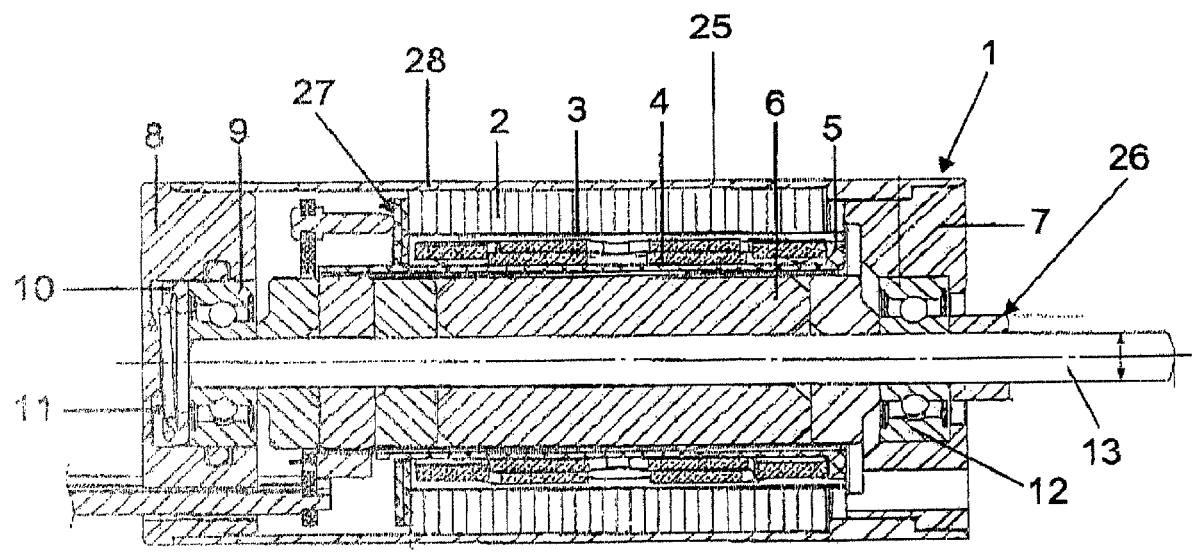
FIG. 1 is a section view of an exemplary motor according to the present invention.
Figure 2:
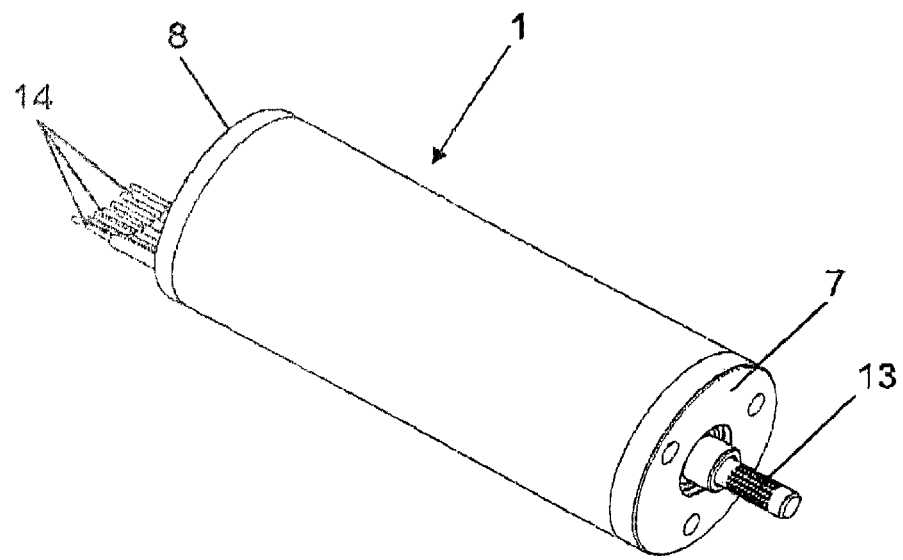
FIG. 2 is a perspective view of the motor according to FIG. 1.

The brushless DC motor 1 of the present invention shown in FIGS. 1 and 2 comprises a rotor 26, which is composed of a rotor shaft 13, on which is fixed a cylindrical permanent magnet 6. The rotor 26 is rotatably supported by means of two bearings 9 and 12, which are fixed within endplates 7 and 8 which each is an end plate or end bell of a housing 28. The two end plates 7 and 8 are arranged in a distance to each other and connected by means of tubular housing member 25 can be made either of a magnetic or of a non-magnetic material. A compression spring 11 is inserted into a gap between the end plate 8 and a washer 10, which applies a pressure on the bearing 10. The purpose of the compression spring 11 is to provide a calibrated force on the bearing outer race, which is also called preload.

Figure 4:
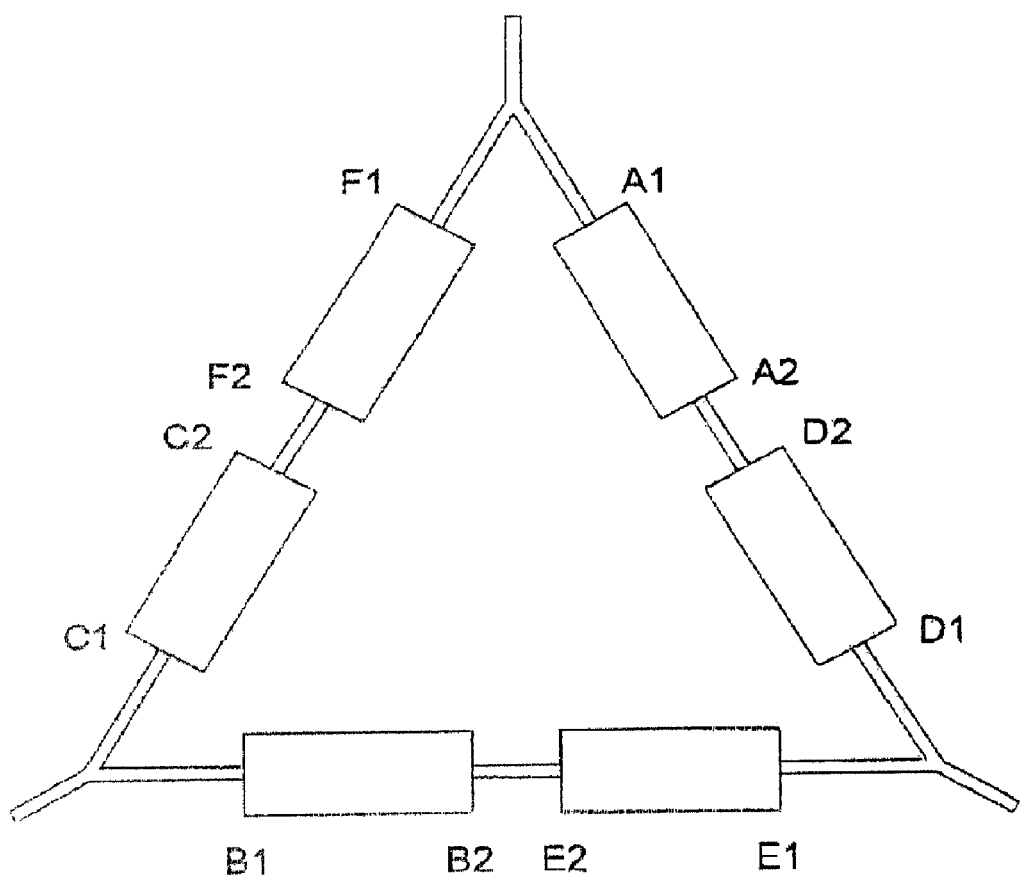
FIG. 4 is a connection diagram showing one possible way to connect, six individual coils for example in a delta-serie configuration.
Figure 6:
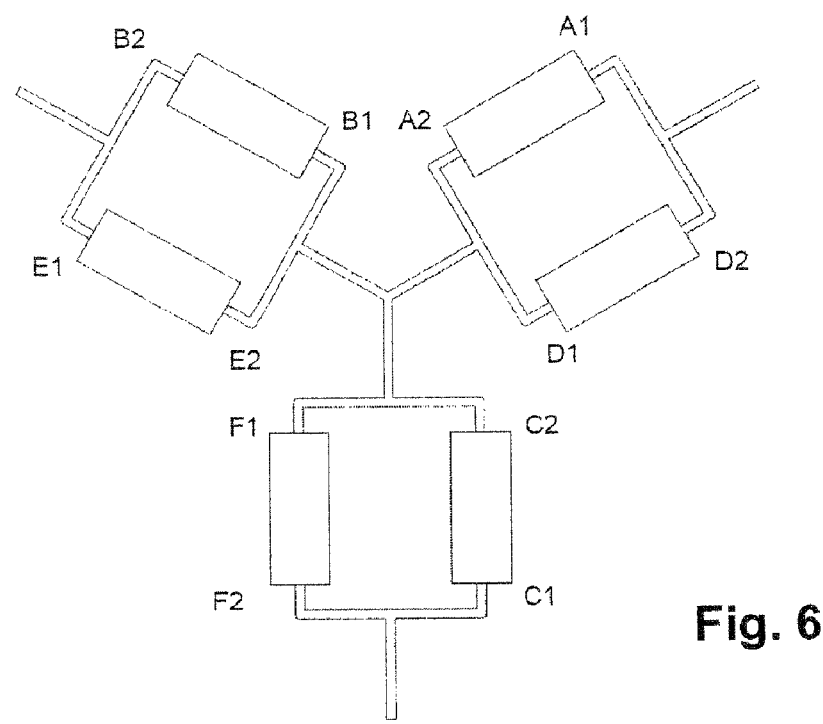
FIG. 6 is a connection diagram showing one possible way to connect six individual coils for example in a star-parallel configuration.
Figure 10:
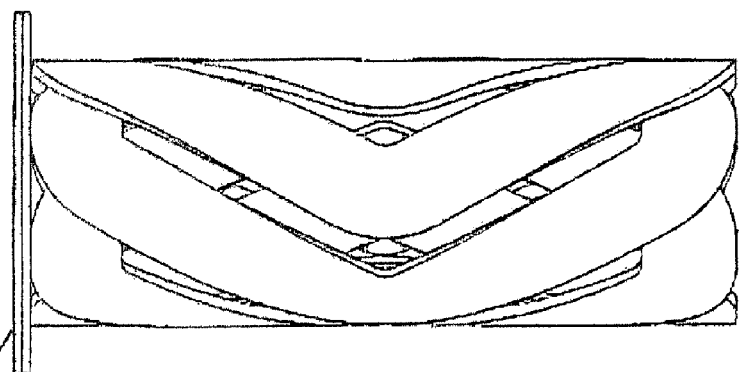
Figure 11:
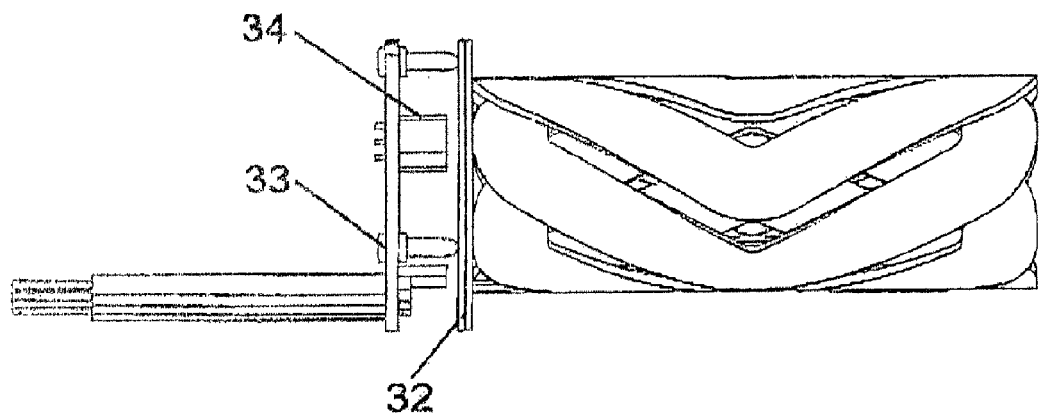

Within the housing 28 a stator 27 is arranged, which comprises a laminated yoke 2, which is fixed to an internal surface of the housing part 25. Between the laminated yoke 2 and an insulating tube there is arranged a winding body 4, which is a part of the stator 27 and is composed of six single coils A to F, which are identical to each other. The six single coils A to F are connected to a printed circuit board 32 as shown in FIG. 10. The printed circuit board 32 which is connected to the coils A to F comprises not shown traces that connect electrically the start and finish wires of the six coils A to F in such a way that different connection configurations can be obtained, for example delta and serie or parallel as shown in FIGS. 4 and 6. The assembly of the coils A to F is rigidly connected to a printed circuit board 33 shown in FIG. 11 to form a complete module. The printed circuit board 32 can support hall effect sensors 34, in case of a motor with sensors, and also not shown lead wires to connect the motor externally. The lead wires can be replaced by axial contacts or straight pins or by a connector depending on the motor electrical interface. The module made of the coil assembly and the printed circuit board assembly 33 are assembled separately before insertion into the laminated yoke.

Figure 3:
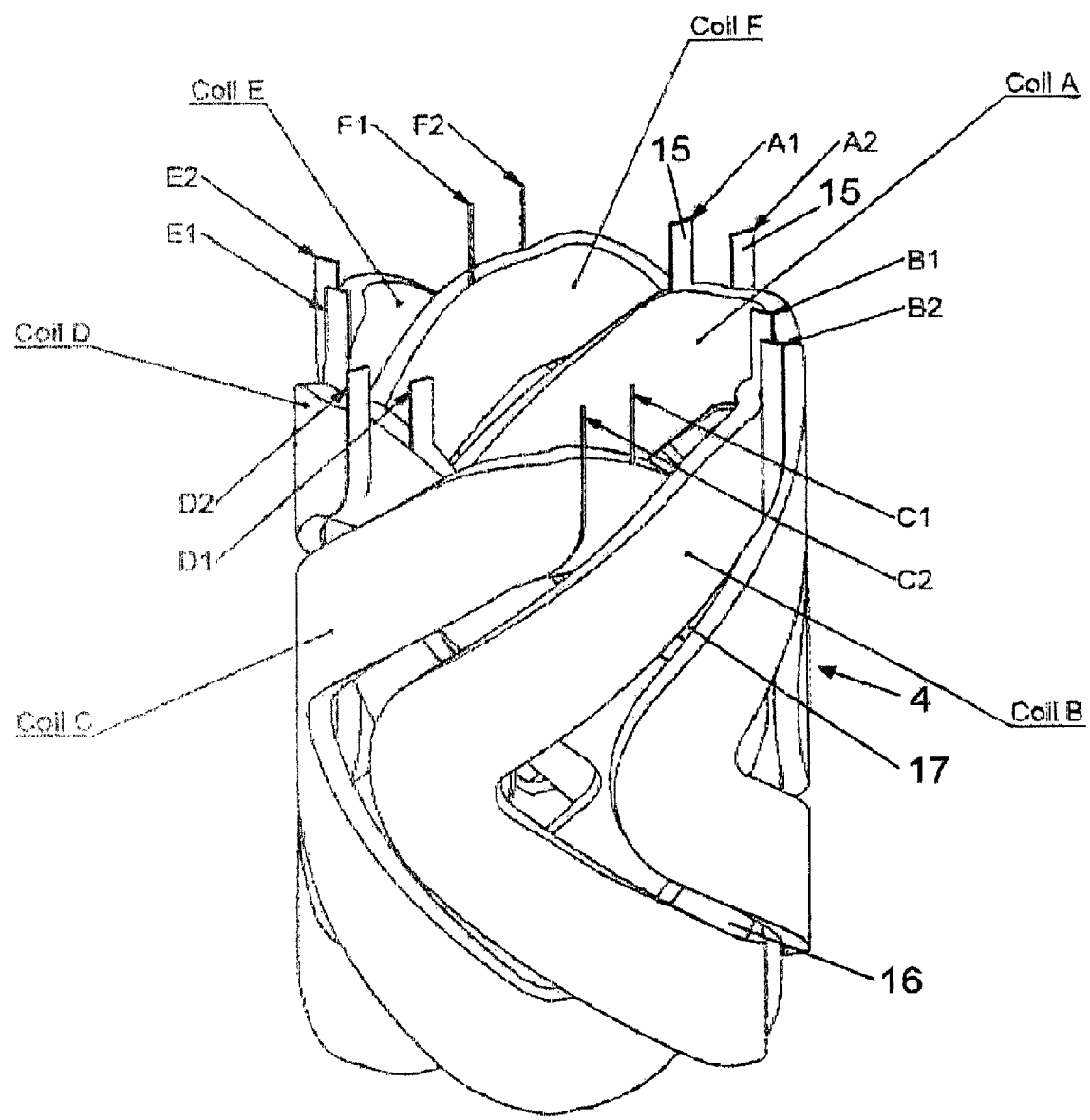
FIG. 3 is a perspective view of the coil assembly made of six individual coils.
Figure 5:
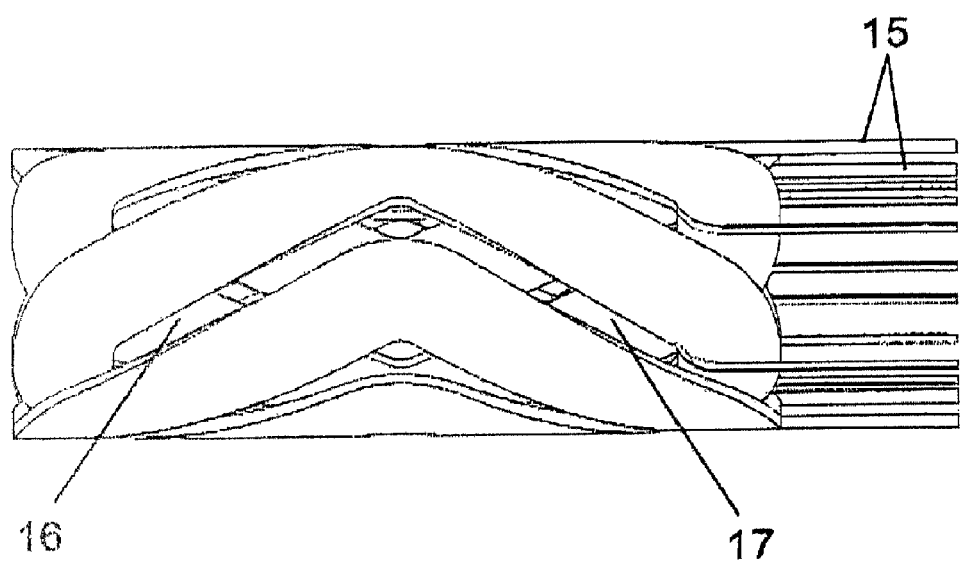
FIG. 5 is another perspective view of the winding body.
Figure 7:
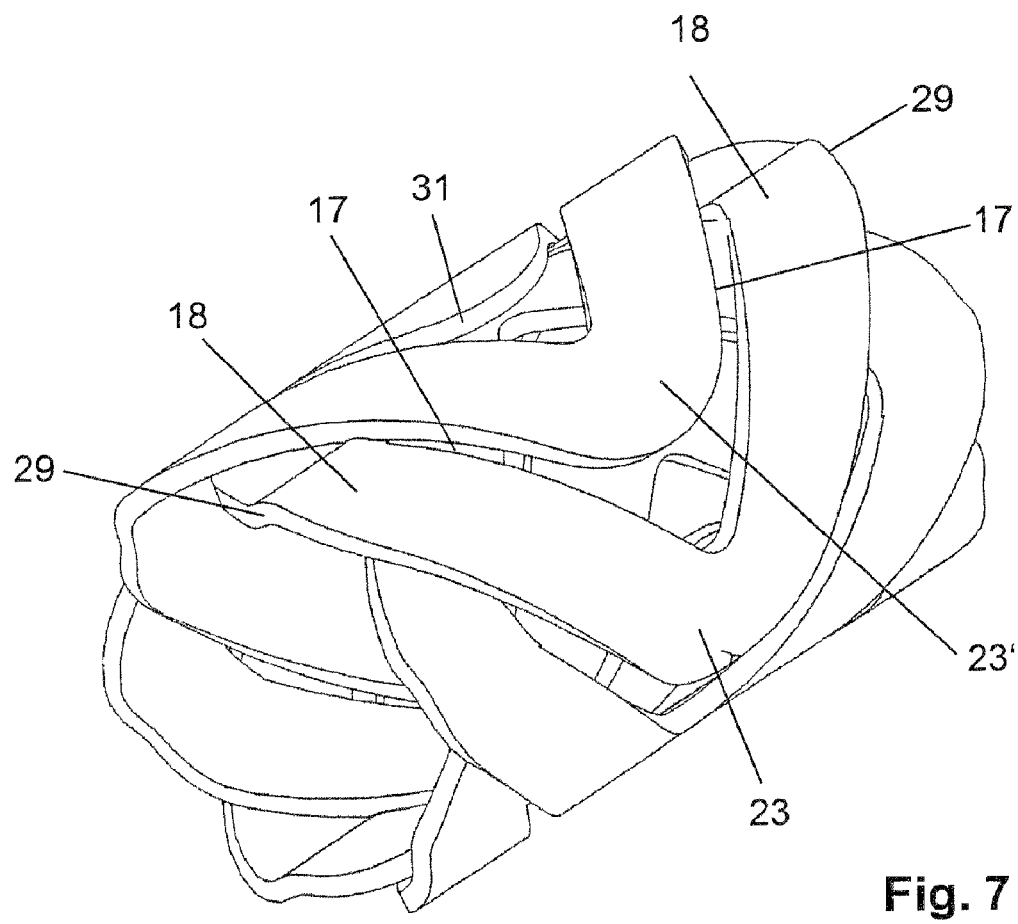
FIG. 7 is another perspective view of the winding body.

The winding body 4 as shown in FIGS. 3, 5 and 7 has the shape of a hollow cylinder. The single coils A to F overlap each other in an imbricated manner. Each single coil A to F has a polygonal and especially rhombic shape and is wound with a given number of turns using a flat and especially rectangular magnetic wire 15 (FIG. 3). Each single coil A to F is formed separately to obtain an accurate shape. The coils A to F are interlocked without using any separate part to form the cylindrical winding body 4.

Figure 8:
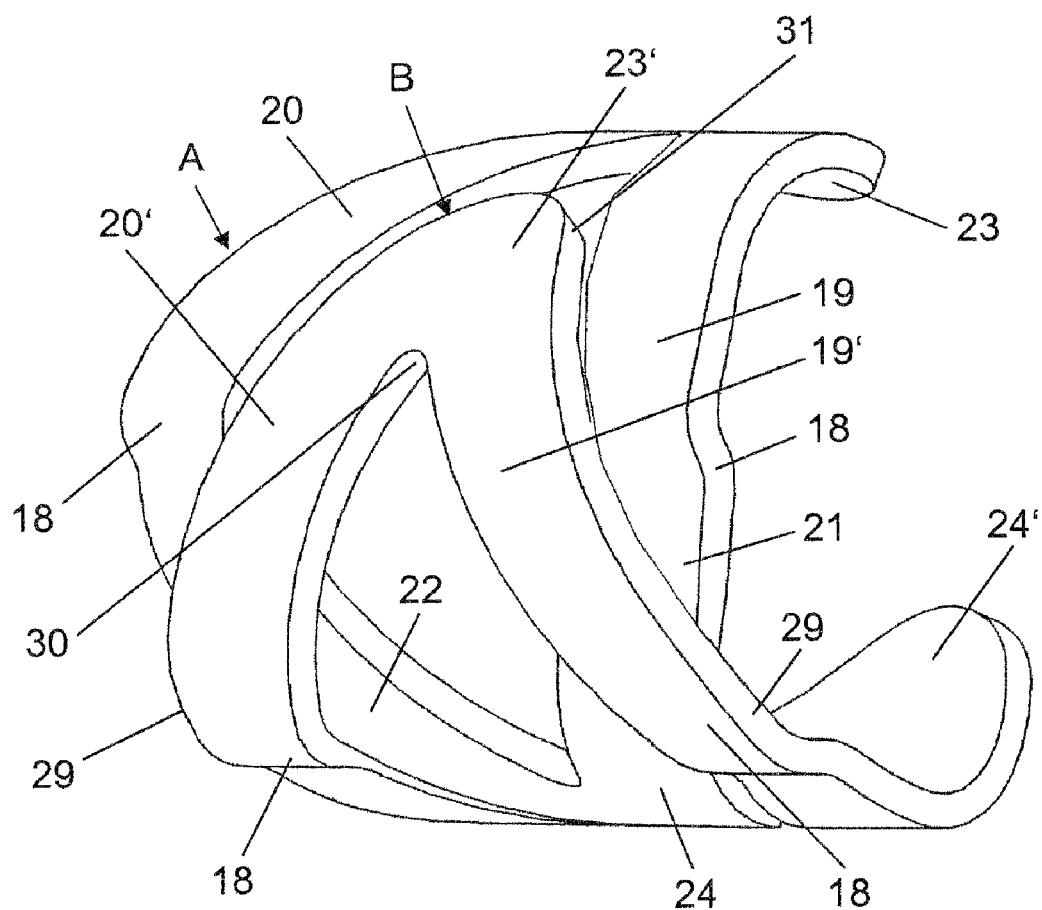
FIG. 8 is a perspective view of two single coils assembled together.
Figure 9:
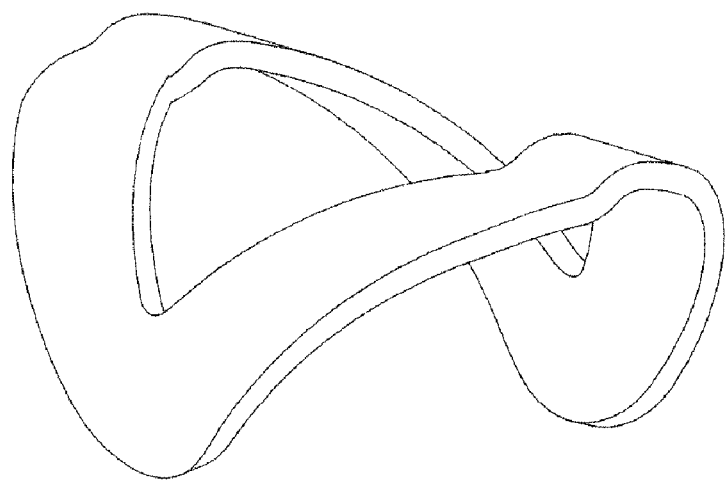
FIG. 9 is a perspective view of a single coil, FIG. 10 a radial view of an assembly of six coils connected to a printed circuit, FIG. 11 a radial view of a stator made of a coil assembly and a printed circuit board assembly and FIG. 12 an axial view of a single coil.
Figure 12:
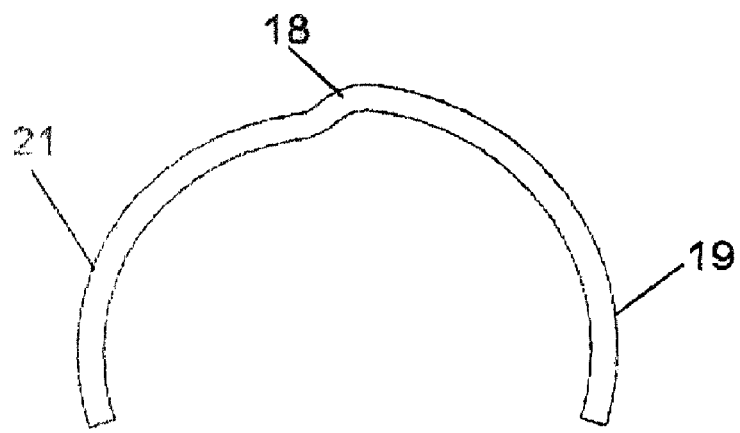

The single coils A to F form an offset 18 in the region of two opposite corner 29 as especially shown in FIGS. 7, 8 and 12. Further the single coils A to F have two legs 19 and 20, which are located on a first radius and two legs 21 and 22, which are located on a second radius. The legs 19 and 20 are connected to each other at a bend 23, which is located on the first radius and the legs 21 and 22 are connected at a bend 24 located on the second radius. Each bend 23 has a concave internal narrow side 30 and a convex external narrow side 31 as best shown in FIG. Leg 21 and 22 are bent on a smaller radius and leg 19 and 20 are bent on a larger radius. The radius of the internal side of leg 19 and leg 20 is larger or equal to the radius of the external side of leg 21 and leg 22. By doing so, leg 21 and leg 22 of coil A are overlapped by leg 19' and 20' of coil B with no interference. Adjacent single coils A to F meet each other in the region of the corners 29, wherein outside these regions there is a gap 16 and 17 between adjacent single coils. Outside the corners 29 the single coils A to F therefore do not meet each other.

Start of each coils are designated A1 to F1. Finish of each coils are designated A2 to F2. The start and finish of each coil are soldered to a PCB to form "coil assembly". The coil assembly is rigid enough to be manipulated as an assembly. For example the connection pattern can be a serial delta connection as shown in FIG. 4 or a parallel star connection as shown in FIG. 6. Instead of six single coils A to F as shown, the winding body 4 can have more than six single coils or only three single coils.

LIST OF REFERENCE NUMBERS 1 motor 21 leg
2 laminated yoke 22 leg
3 insulator coil 23 bend
4 coil assembly 24 bend
5 tube 25 housing
6 magnet 26 rotor
7 end plate (end bell) 27 stator
8 end plate (end bell) 28 housing
9 bearing 29 corner
10 washer 30 internal side
11 spring 31 external side
12 bearing 32 printed circuit board
13 rotor shaft 33 printed circuit board assembly
14 lead wires 34 hall effect sensor
15 flatwire A coil
16 gap B coil
17 gap C coil
18 offset D coil
19 leg E coil
20 leg F coil

The invention claimed is:

1. A brushless DC electric motor comprising:
    a) a rotor including a shaft and a permanent magnet fixed on said rotor shaft,
    b) stator including a winding in the shape of a hollow cylinder and composed of a plurality of rhombic single coils made of flat wire, wherein the single coils overlap each other in an imbricated manner, wherein the single coils are performed to form an offset at least in the region of two opposite corners, wherein the winding have legs and wherein half of the legs are located in a first radius and half of the legs are located in a second radius,
    c) a housing having two end plates and supporting said rotor and stator,
    wherein there is a gap between adjacent coils, and the wires have a rectangular cross section.

2. A brushless motor according to claim 1, wherein the single coils have a rhombic shape, wherein legs of the coils are inclined to the axial direction of the motor.

* * * * *